United States Patent [19]

Johnson

[11] 4,005,758
[45] Feb. 1, 1977

[54] WEIGH SCALES

[76] Inventor: Berthuld Thomas Johnson, 1551-97th St., North Battleford, Saskatchewan, Canada

[22] Filed: Apr. 4, 1975

[21] Appl. No.: 564,867

[52] U.S. Cl. ............................ 177/229; 177/196
[51] Int. Cl.² .................................... G01G 3/08
[58] Field of Search .......... 177/210, 225, 229, 196, 177/DIG. 9

[56] References Cited

UNITED STATES PATENTS

| 3,191,702 | 6/1965 | Kohlagen | 177/229 |
| 3,474,875 | 10/1969 | Laimins | 177/229 |
| 3,508,624 | 4/1970 | Horan | 117/196 |
| 3,658,142 | 4/1972 | Marshall | 177/DIG. 9 |
| 3,658,143 | 4/1972 | Schwartz | 177/229 |
| 3,788,411 | 1/1974 | Oxley | 177/229 |
| 3,837,222 | 9/1974 | Raskin | 177/211 |
| 3,840,081 | 10/1974 | Brann | 177/196 |
| 3,863,725 | 2/1975 | Raynes | 177/52 |

Primary Examiner—L. T. Hix
Assistant Examiner—Vit W. Miska
Attorney, Agent, or Firm—Stanley G. Ade

[57] ABSTRACT

A base frame supports a load receiving frame by means of opposed torsion bars and a load cell is situated between the load receiving frame at the base frame. This load cell component which may be mechanical or electrical, indicates the load on the scale and the torsion bars transfer the load from any part of the load receiving frame to the centrally located load cell component. The device can be provided with single or double torsion bars on two or four sides and is readily adapted for weighing animals, trucks, grain and the like.

7 Claims, 10 Drawing Figures

WEIGH SCALES

BACKGROUND OF THE INVENTION

This invention relates to new and useful improvements in weigh scales, particularly weigh scales adapted for use in the weighing of animals, trucks, grain and the like.

Normally such weigh scales operate on the conventional beam principle and in order to be accurate, the object to be weighed is preferably located centrally on the weight receiving platform.

This makes it particularly difficult to weigh cattle and the like and in general, due to the mechanical connections between the weight receiving platform and the beam, such scales are relatively inefficient.

SUMMARY OF THE INVENTION

This invention overcomes the disadvantages by the provision of torsion bars connecting the weight receiving platform or frame to the supporting framework and by providing a load cell type of weight indicating means situated between the weight receiving platform and the base.

The torsion bars enable a weight applied to any part of the loading receiving platform, to be transferred accurately to the load cell inasmuch as the torsion bars transfer the weight from the point of contact to the load receiving cell.

The device is readily adapted for use with a cattle squeeze box so that cattle can be weighed rapidly and easily and merely by changing the dimensions, is adapted for use to weigh trucks containing animals, grain or the like.

The principle object and essence of the invention is to provide a device of the character herewithin described which incorporates a load cell component between the weight receiving platform or frame and the supporting base and which includes torsion bars to transfer the weight accurately to the load cell.

Another object of the invention is to provide a device of the character herewithin described which includes means to preload the load receiving frame or platform thus leading to greater accuracy in measurement.

Still another object of the invention is to provide a device of the character herewithin described which eliminates pivots and the like thus providing a device which requires the minimum of maintenance.

A still further object of the invention is to provide a device of the character herewithin described which is simple in construction, economical in manufacture and otherwise well suited to the purpose for which it is designed.

With the foregoing objects in view, and other such objects and advantages as will become apparent to those skilled in the art to which this invention relates as this specification proceeds, my invention consists essentially in the arrangement and construction of parts all as hereinafter more particularly described, reference being had to the accompanying drawings in which:

DESCRIPTION OF THE DRAWINGS

In the drawings like characters of reference indicate corresponding parts in the different figures.

DETAILED DESCRIPTION

Figure 1:
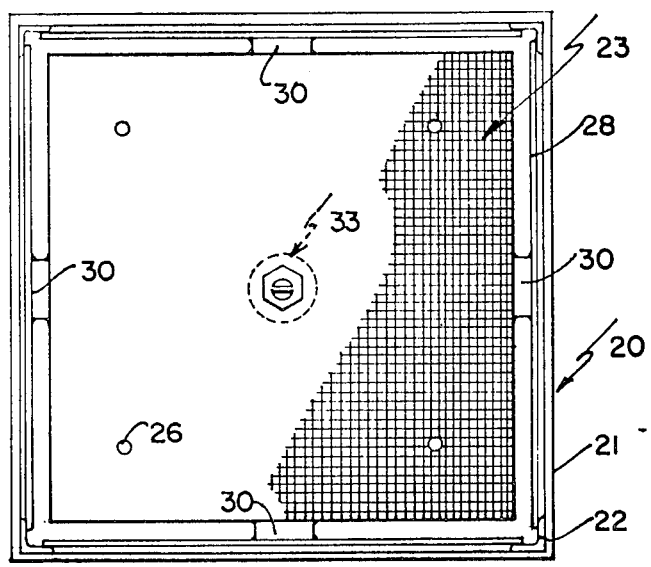
FIG. 1 is a top plan view of one embodiment of the invention with the weight receiving platform removed for clarity.
Figure 2:
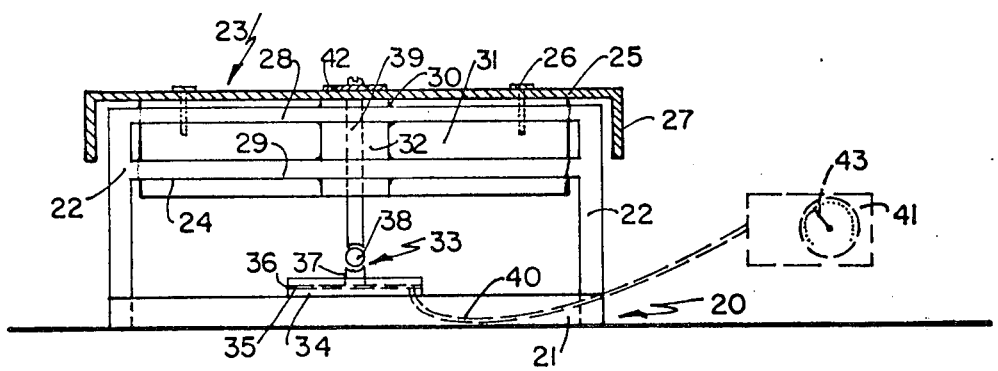
FIG. 2 is a side elevation of FIG. 1 with the weight receiving platform in cross section.

Proceeding therefore to describe the invention in detail, reference should be made to the drawings in which reference character 20 illustrates a substantially rectangular base frame including base members 21 and upstanding posts or supports 22 and 23. In FIGS. 1 and 2, the upstanding posts 22 are situated adjacent the corners of the base frame 20 whereas in FIGS. 3 and 4, these upstanding posts are situated intermediate the ends of the sides forming the base frame 20.

A substantially rectangular load receiving platform or frame is provided collectively designated 23. This consists of rectangular supporting structure 24 and an upper load receiving platform or plate 25 secured to the supporting structure by means of bolts 26 and it will be observed that the outer vertical sides 27 of this plate 25 extend beyond the confines of the base structure 20 as clearly illustrated in FIGS. 2 and 3.

Means are provided to support the load receiving frame 23 to the base frame 20 and take the form of a plurality of torsion bars operatively connected between the two and which will hereinafter be described.

Dealing first with the embodiment shown in FIGS. 1 and 2, upper torsion bars 28 are provided together with lower torsion bars 29 although, depending upon design perameters, only one set of torsion bars may be required.

In the embodiment shown in FIGS. 1 and 2, these torsion bars are secured intermediate the ends thereof as by welding 30, to intermediate the sides 31 of the supporting structure 24 of the load receiving frame and in this connection, a spacer bar 32 can be provided or, alternatively, the torsion bars can be bent inwardly at this point of connection.

The outer ends of the torsion bars 28 and 29 are secured as by welding to the corner supports or posts 22 thus suspending the load receiving frame 23 within the base frame 20.

These torsion bars transfer the weight on the platform to a centrally located load indicating component collectively designated 33.

In the present embodiment illustrated, this component 33 takes the form of a load cell which comprises a cylindrical body 35 having a piston 36 therein connected to a piston rod 37 extending above the cylinder 35. A ball 38 engages the upper end of the piston rod 37 and this ball is engaged by the lower end of a screw threaded bolt 39 extending downwardly from the load receiving frame 23.

The cylinder is filled with hydraulic fluid (not illustrated) and a tube 40 extends from the base of the cylinder to a pressure gauge shown in phantom by reference character 41 in FIG. 2. This forms a closed system so that any weight on the platform 23 causes the pressure gauge to move and this can be graduated to measure pounds directly.

The bolt 39 is preferably screw threaded at the upper end thereof and is provided with a nut 42 so that the system can be preloaded by screwing the bolt downwardly through the platform 23 and locking same in position by means of nut 42. This places the system under pressure whereupon the dial needle 43 can be reset to zero thus giving greater accuracy in the measuring process.

Figure 3:
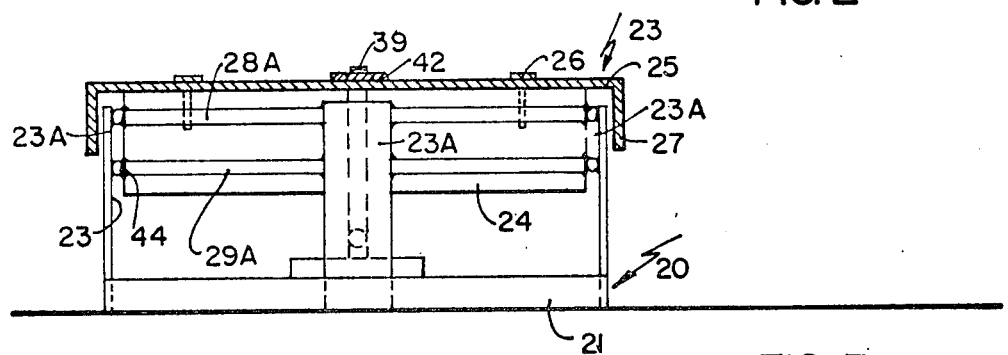
FIG. 3 is an alternative construction to that shown in FIGS. 1 or 2.

In FIG. 3, an alternative construction is shown in which the torsion bars 28A 29A are secured by the ends thereof to adjacent the corners 44 of the portion 24 of the load receiving frame 23. These torsion bars are then secured as by welding to the centrally located posts 23 with the load cell component being similar to that hereinbefore described.

Figure 4:
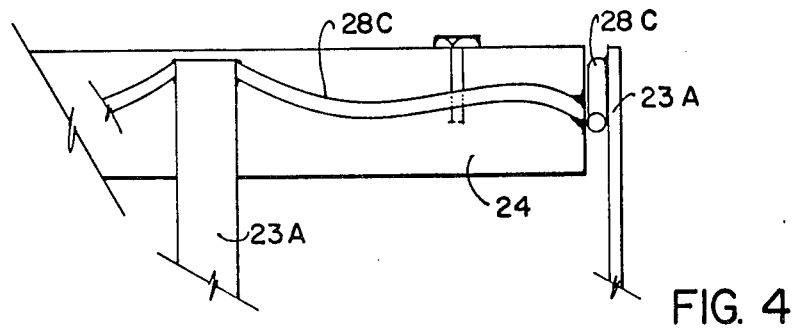
FIG. 4 is a fragmentary side elevation showing a still further embodiment to that shown in FIGS. 2 or 3.

If required, the torsion bars may be curved as illustrated by reference character 23C in FIG. 4 thus giving greater flexibility in a restricted space.

In all cases these torsion bars are preferably of round bar stock and of a spring steel material so that any weight upon the platform 25 is transferred to the load cell component 33.

Alternatively of course this load cell component may take the form of an electrical strain gauge assembly (not illustrated) but as such as assembly is well known, it is not believed necessary to illustrate or describe same further.

Figure 5:
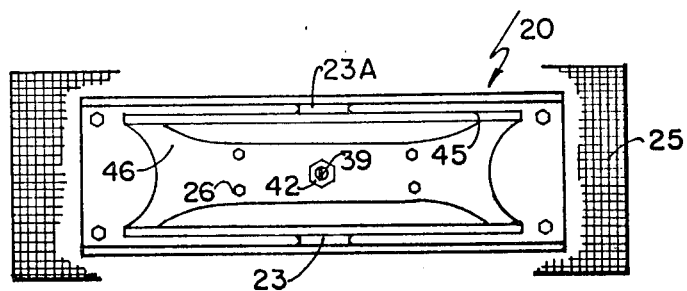
FIG. 5 is a top plan view of an alternative embodiment of the device with the weight receiving platform fragmented for clarity.
Figure 6:
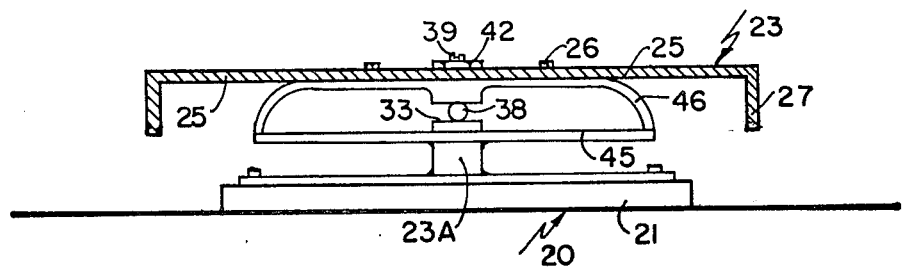
FIG. 6 is a side elevation of FIG. 5 showing one embodiment.

FIGS. 5 and 6 show an alternative embodiment particularly designed for use in weighing cattle and may be incorporated either with or without a conventional squeeze gate assembly (not illustrated).

Where applicable, similar reference characters have been used in these illustrations.

In FIGS. 5 and 6, the base 21 is provided with a centrally located upwardly extending post 23 on each side thereof to which the torsion bars 45 are secured centrally as by welding.

The ends of these torsion bars are secured as by welding to the ends of the supporting structure 46 of the load receiving frame 23 and the load receiving platform or plate 25 is secured to this support by means of bolts 26 as hereinbefore described.

Once again the provision of the pair of oppositely situated torsion bars 45, balances the load on the platform and transfers same to the load cell component 33 situated centrally between the load receiving frame 23 and the base frame 20.

Figure 7:
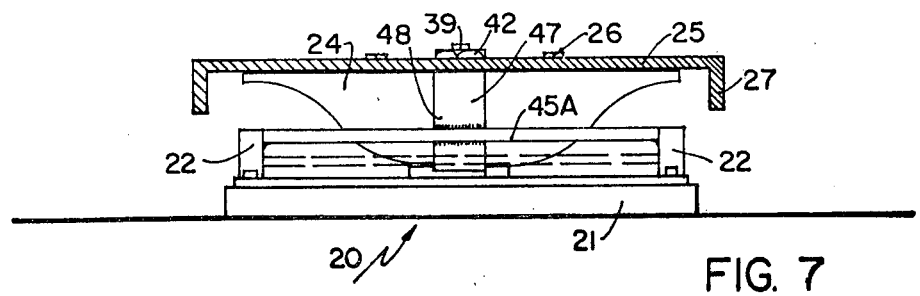
FIG. 7 is a side elevation similar to FIG. 5 but showing an alternative embodiment.

FIG. 7 shows a view similar to FIGS. 5 and 6 but with the torsion bars 45A reversed inasmuch as they are secured by the ends thereof to the upwardly extending posts 22 and by the centre thereof to intermediate the ends of opposed sides of the platform support structure 46. In this instance portions 47 may be welded or otherwise secured to the sides of the supporting structure 45 with the torsion bars welded thereto as indicated by reference character 48.

Figure 8:
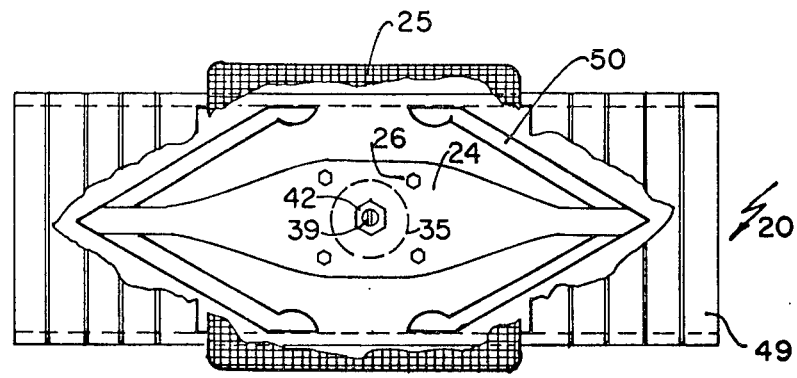
FIG. 8 is a top plan view of an embodiment for use with trucks or the like with the top platform fragmented for clarity.
Figure 9:
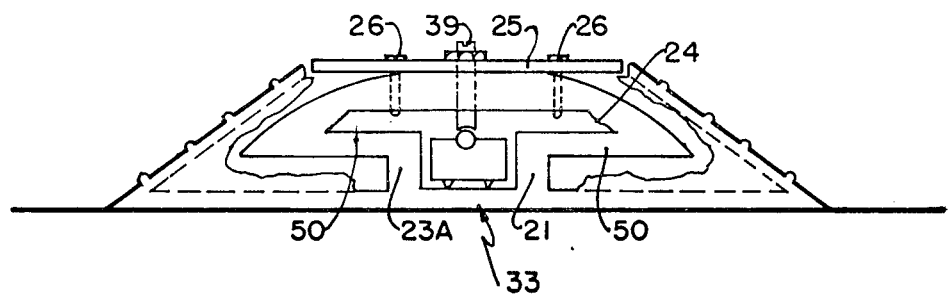
FIG. 9 is a side elevation of FIG. 8.

FIGS. 8 and 9 show the weigh scale adapted for use with inclined ramps 49 on each end of the base frame 20 so that a truck or the like can be driven onto the weigh scale. In this connection the entire scale can be made large enough to receive the truck or, alternatively, two-way scales can be used in spaced and parallel relationship so that the wheels of the truck engage the two scales.

The construction of this embodiment is similar to that hereinbefore described inasmuch as the weight receiving platform 25 is secured to the supporting frame 24 by means of bolts 26.

Torsion bars 50 are secured by the outer ends thereof to the support frame 24 and by the inner ends thereof to spaced vertical support members 23A extending upwardly from the base frame 20.

Once again a load cell component 33 is situated between the load receiving frame 23 and the base frame 20 and connected to a gauge similar to that illustrated in FIG. 2.

Figure 10:
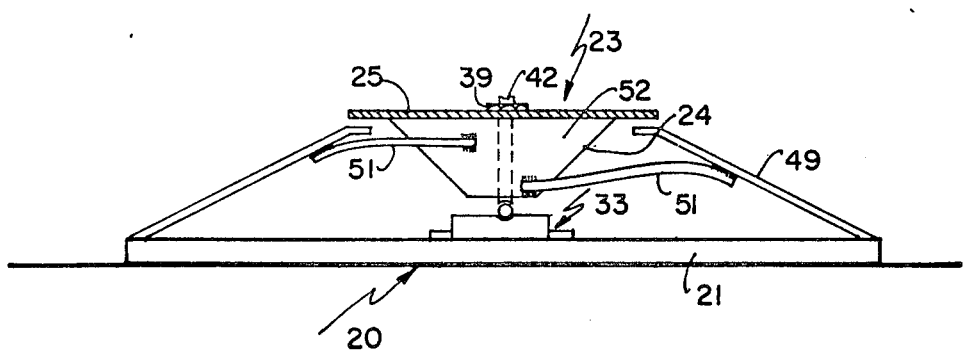
FIG. 10 is a side elevation partially sectioned showing an alternative construction to that illustrated in FIGS. 8 and 9.

FIG. 10 shows an alternative arrangment of the embodiment shown in FIGS. 8 and 9 in which the torsion bars 51 extend between side plates 52 of the support framework 20 and the underside of the ramps 49.

The inner ends of the torsion bars are staggered as clearly shown with the bar on the lefthand side with reference to FIG. 10, being welded to the side plate 52 adjacent the upper edge thereof and the torsion bar on the righthand side with reference to FIG. 10, being welded to the side plate adjacent the lower edge thereof.

This particular embodiment is relatively simple in construction and of course incorporates a load cell component 33 as hereinbefore described.

In all cases, the scale can be loaded for accuracy or, alternatively, to take into account the weight of a container such as a truck.

The construction is particularly suited for use under adverse weather conditions and as no pivotal connections are provided, accuracy is maintained in a relatively easy manner.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention:

1. A weigh scale comprising in combination a base frame component, a load receiving frame component within said base frame, a torsion bar situated on each side of at least one pair of opposite sides of said scale and being fixedly and operatively connected between said base frame component and said load receiving frame component, to support said load receiving frame component relative to said base frame component, and load indicating means operatively connected between said components, each of said torsion bars being secured intermediate the ends thereof to one of said components and by each end thereof to adjacent the ends of the other of said components.

2. The scale according to claim 1 in which each of said torsion bars is secured by the ends thereof to said base frame component and is secured intermediate the ends thereof to the corresponding side of said load receiving frame components intermediate the ends of said corresponding side.

3. The scale according to claim 1 in which each of said torsion bars is secured intermediate the ends thereof to said base frame component and by each end thereof to adjacent each end of the corresponding side of said load receiving frame component.

4. The scale according to claim 1 which includes a torsion bar situated on each side of the other pair of opposite sides of said scale and also being fixedly and operatively connected between said base frame component and said load receiving frame component to support said load receiving frame component relative to said base frame component.

5. The scale according to claim 1 in which said load indicating means takes the form of a load cell, and a ball bearing mounting between said load cell and said load receiving frame component.

6. The scale according to claim 4 in which each of said torsion bars is secured by the ends thereof to said base frame component and is secured intermediate the ends thereof to the corresponding side of said load receiving frame component intermediate the ends of said corresponding side.

7. The scale according to claim 4 in which each of said torsion bars is secured intermediate the ends thereof to said base frame component and by each end thereof to adjacent each end of the corresponding side of said load receiving frame component.

* * * * *